(No Model.)
2 Sheets—Sheet 1.
J. B. GRISWOLD.
DOUBLE ACTING FORCE PUMP.
No. 276,172. Patented Apr. 24, 1883.
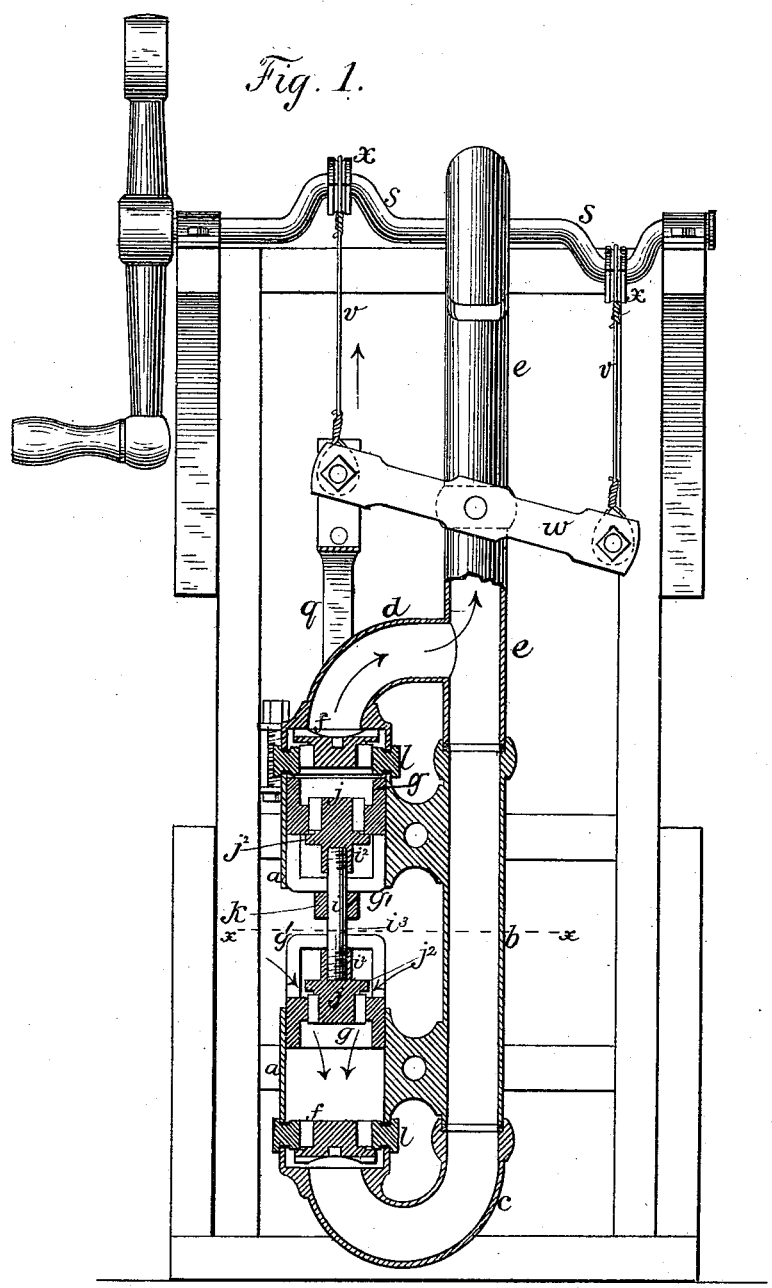
Witnesses:
Edmond Brodhag
Nowell Bartle
Inventor:
pro James B. Griswold
Johnson and Johnson
Attys (No Model.) 2 Sheets—Sheet 2.
J. B. GRISWOLD.
DOUBLE ACTING FORCE PUMP.
No. 276,172. Patented Apr. 24, 1883.
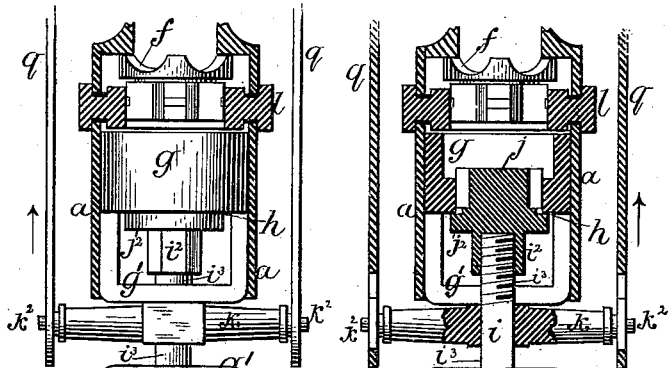
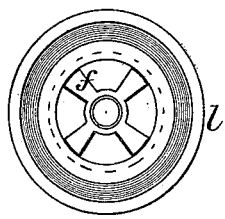
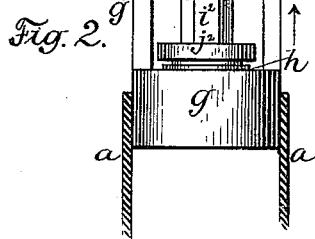
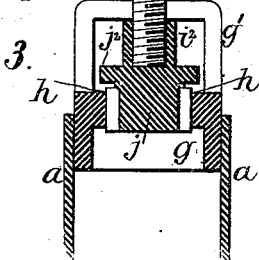
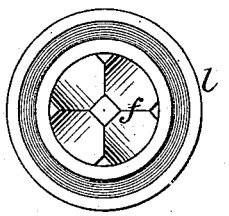
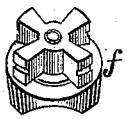
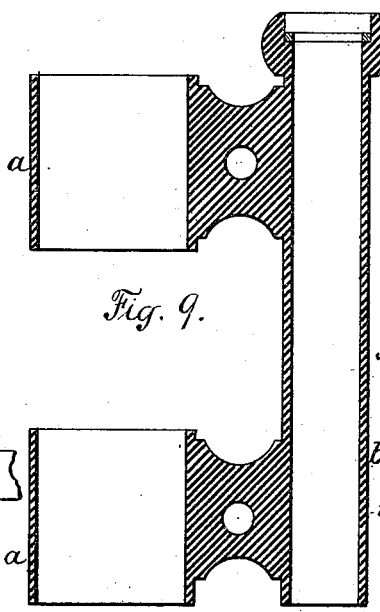
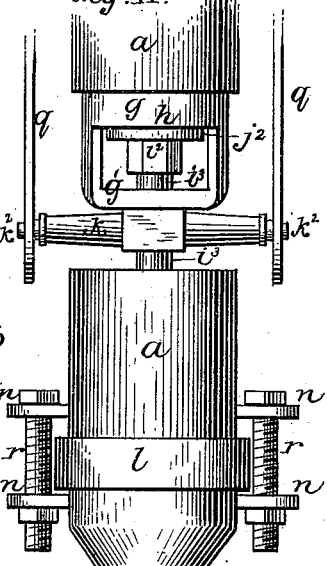
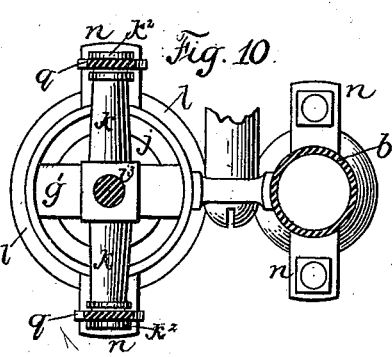
Witnesses:
Edmund Brodhag
Howell Barth
Inventor:
James B. Griswold
Johnson & Johnson
Attys
N. PETERS, Photo-Lithographer, Washington, D. C.

UNITED STATES PATENT OFFICE.

JAMES B. GRISWOLD, OF SEDALIA, MISSOURI.

DOUBLE-ACTING FORCE-PUMP.

SPECIFICATION forming part of Letters Patent No. 276,172, dated April 24, 1883.

Application filed December 7, 1882. (No model.)

*To all whom it may concern:*

Be it known that I, JAMES B. GRISWOLD, a citizen of the United States, residing at Sedalia, in the county of Pettis and State of Missouri, have invented new and useful Improvements in Double-Acting Force-Pumps, of which the following is a specification.

My improvement relates to submerged double-acting force-pumps in which a double plunger-valve attached directly to the operating-rod is employed to impart motion to separate and independent hollow plunger-pistons working within a cylinder open to admit water, and connected at each end to the discharge-pipe.

The specific matter of my improvement will be hereinafter described and made the subject of distinct claim.

The objects of my improvements are to provide a double-acting submerged pump of the simplest and cheapest construction, to effect an even flow of the water, and an arrangement and construction of valves and joint-forming parts, whereby the pump is rendered durable in its working and connecting-joint parts.

Referring to the accompanying drawings, Figure 1 represents a vertical section of a pump embracing my improvements, showing the piston-plungers on their upward stroke; Fig. 2, a view in elevation of the double plunger-valves, and the hollow plunger-pistons, in elevation, connected therewith; Fig. 3, a vertical section of the same; Fig. 4, a detail section of the cylinder joint-ring, which forms the seat for the crown-valve; Fig. 5, a top view; Fig. 6, a bottom view of the same, and Fig. 7 the valve; Fig. 8, details of the operating connections; and Fig. 9 shows the casting which constitutes the open-ended piston-cylinders and a portion of the water-pipe; Fig. 10, a horizontal section, and Fig. 11 an elevation.

The hollow plunger-pistons operate within separate and distinct cylinders $a\ a$, arranged vertically one above the other, the space between them being about equal to the stroke of the pistons. These cylinders $a\ a$ are open at each end, and are cast integral with a section, $b$, of the water-pipe, as shown in Fig. 9. A curved tubular section, $c$, connects the lower end of the pipe-section $b$ and the lower cylinder, while the upper cylinder is connected with an upper section, $e$, of the water-pipe by a curved tubular branch, $d$. These tubular cylinder-connections $c\ d$ form chambers for the reception of crown-valves $f f$, arranged within ring-seats placed at the joining of the cylinders with the water-pipe connections, as will be hereinafter more particularly described.

The plunger-pistons $g\ g$ are hollow and fit the interior of the cylinders, each having a yoke, $g'\ g'$, extending from the end, which forms the seat $h$ for the double plunger-valve. The cross-bar of each piston-yoke has a central circular perforation (see Fig. 10) to receive the cylindrical stem $i^3$ of the double plunger-valve, so as to allow the pistons to have a limited vertical movement upon the stem $i$, and to be free to turn thereon in their upward and downward movements within the cylinders. This freedom of the pistons for rotary movement in connection with their reciprocating movement serves to prevent the unequal wear of the pistons and the cylinders, which is a matter of much importance in separate pistons operating without packing.

A valve, $j$, is screwed upon each end of the stem $i$, having a flat face fitting the seat-forming end $h$ of the cylinder, between the yoke-arms $g'$ and a scalloped hub fitting the interior of the piston. Each valve $j$ has a stem part, $i^2$, between the yoke-arms $g'$, by which it is screwed upon the cylindrical stem. A cross-head, $k$, is secured upon the stem centrally between the cross-bars of the piston-yoke $g'$, whereby the plunger-pistons are operated by the operating-crank. This cross-head $k$ and the screw-threaded ends $i^2$ of the valves $j$ form stops between which the piston-yokes have a limited movement, whereby the valves $j$ are caused to open and close with the pistons of the cylinders upon each upward and downward stroke of the double plunger-valve. It is upon the cylindrical part of the stem $i$ that the pistons are free to turn and said stem to move vertically within said piston-yokes, and the extent of the latter movement is only sufficient to open and close the central opening of the piston with the flat valve-head $j^2$, and is determined or adjusted by screwing the valves upon the stem $i$ nearer to or farther from the cross-head of said stem.

The joining of the cylinders with the branch water-pipes $b\ e$ is made without flanges by means of joint-rings $l$, formed with circular face-recesses, which are filled with soft metal adapted to form packing-seats for the ends of the cylinders and the chambered ends of the curved branches c d of the water-pipe. These joint packing-rings also form the seats for crown-valves f, which are fitted within the central openings of said joint-rings, so that the flat valve-heads open and close with the ring-seats. The opposite faces of the valve-heads f are scalloped, and the opening movements of these valves are limited by striking against the inner sides of the chambers of the branch couplings. The lower crown-valve opens downward and the upper crown-valve opens upward. Therefore upon the upward movement of the pistons and their valves the lower valve j opens with its piston and the upper one closes with its piston, and vice versa upon the downward movement of the pistons and their valves. The cylinders and the pipe-sections are cast with lugs n to receive screw-bolts r, (see detail, Fig. 11,) by which the pipe-branches and the cylinders are clamped together upon the valve-seat rings. The sections of the water-pipe are coupled in the same way. The circumference of the ring valve-seats forms a band around the joining of the cylinders and pipe-sections.

A bail, q, serves to connect the double-plunger valve-stem with the operating crank-shaft s by means of cross-bars w, pivoted to the water-pipe and to the upper end of the bail. I prefer to use a double-crank shaft, and connect each crank with each end of the pivoted cross-bars, the cranks being arranged in opposite positions to operate with a pulling action at each stroke of the pistons. To increase the durability of these rod-connections, I provide bearings x at each pivot-connection, around which wire connections v are wound. These bearings are of two sections, one being of semicircular form and the other elongated, both sections having grooves similar to a sheave, and when joined are secured by wrapping the wire around them, thereby preventing the wire connections from being cut out as the bearings form the wearing parts. By using these bearings I am enabled to use stout wire as the means of connecting the crank-shaft with the pivoted cross-bars, and to utilize such connections to secure the sectional bearings to the pivots and to the cranks. A simple means of connecting the bail with the cross-head of the valve-stem is by forming elongated heads $k^2$ on the bearing ends of the said cross-head and slots in the ends of the bail, as shown in Fig. 8.

In the ascending movements of the connected pistons, the cylinders being submerged, the lower piston will fall, so as to open the valve j on the lower end of the stem i and allow the water to fill the lower cylinder. At the same time the back-pressure of the water in the discharge-pipe will close the lower crown-valve f. In this movement the upper piston also falls at the same time and to the same extent as the lower one, so as to close upon the flat head of the valve j on the upper end of the stem i. The upper crown-valve opens by this movement, and the water is forced from the upper cylinder into the discharge-pipe. Upon the descending movement of the connected pistons the water is forced from the lower cylinder into the discharge-pipe, it being understood that the hollow pistons operate to open and to close their respective valves at all times between the separated ends of the cylinders and within their ends, which are always open in the body of the water, each cylinder filling and emptying as described.

The valves j, when set, may be secured by clamp-screws. The cross-head and the valve-stem are suitably secured together.

I have stated that the pistons have a vertical movement upon the valve-stem i, and it will be understood that the positive vertical movement of the valve-stem effects such movements of the separate pistons to close the valves j therewith.

I claim—

1. The combination, with the separate open cylinders a a and their crown-valves f f, of the separate hollow plunger-pistons g, and the double valve j, connected with said hollow pistons in such manner as to give freedom to the latter for both vertical and rotary movements upon said double valve-stem, substantially as described, for the purpose specified.

2. The combination of the separate open cylinders a a and their crown-valves f f with the separate hollow pistons g, having each a yoke, g', projecting from its valve-seat end, the double valve-stem i, having a cylindrical bearing, $i^3$, for each of said yokes, stops formed by the valve ends $i^2$ and the operating cross-head k, and means for connecting said valve-stem with the operating crank-shaft, substantially as described, for the purpose specified.

3. In combination, in a double-acting force-pump, the separate open cylinders a a, the double plunger-pistons g g, the double valves j j, the packing-seat rings l, and the crown-valves f f, arranged within said packing-rings, all constructed substantially as described, for the purpose specified.

4. The separate cylinders a a, open at each end, and the pump-stock section b of a single casting, in combination with the branch-pipe sections c d, the packing-seat rings l l, the crown-valves f f, arranged therein, the double plunger-pistons g g, and the double valve j j, substantially as described, for the purpose specified.

5. The combination, in a pump, of the double-valved stem i with the bail q, the pivoted cross-bars w, the double crank-shaft s, the connecting-wires v, and their sectional grooved bearings x, all constructed substantially as herein set forth.

In testimony whereof I have hereunto set my hand in the presence of two subscribing witnesses.

JAMES B. GRISWOLD.

Witnesses:
A. P. M. GROSS,
CHAS. L. WATTS.